Patented Sept. 17, 1929

1,728,607

UNITED STATES PATENT OFFICE

IVAN GUBELMANN AND JOHN M. TINKER, OF SOUTH MILWAUKEE, WISCONSIN, ASSIGNORS TO THE NEWPORT COMPANY, OF CARROLLVILLE, WISCONSIN, A CORPORATION OF DELAWARE

PROCESS OF PREPARING ALPHA NAPHTHYLAMINE SULPHONIC ACIDS

No Drawing. Application filed December 11, 1926. Serial No. 154,305.

This invention relates to a process for preparing alpha naphthylamine sulphonic acids. The general method for preparing alpha naphthylamine sulphonic acids comprises sulphonating naphthalene, nitrating the sulphonation mass directly, and then either salting out the alpha nitro sulphonic acids and filtering from the acid solution, or neutralizing the acids with lime and filtering off the gypsum thus formed. The former method has the disadvantage that it requires filtration of a strongly acid solution and that further there is a considerable loss in the filtration due to the solubility of the sulphonic acids in the waste liquor. The latter method necessitates the filtration and washing of bulky precipitates and also requires evaporation of solutions of unstable alpha nitro naphthalene sulphonic acids or of alpha naphthylamine sulphonic acids.

We have now discovered that if ammonia is used to completely neutralize the diluted nitration mass, containing the alpha nitro naphthalene sulphonic acid and free mineral acid, the subsequent reduction step can be carried out without prior filtration or evaporation and in any convenient concentration. Because of the solubility of ammonium salts, both mineral and organic, the concentration may be considerably greater without forming a precipitate than if the neutralization were carried out with alkali instead of ammonia. Furthermore. after the subsequent reduction of the alpha nitro naphthalene sulphonic acids in the ammonia neutralized mass, the excess iron from the reduction may be readily filtered off, the alpha naphthylamine sulphonic acids isolated and the ammonia recovered from the mother liquor by treatment with any free alkali, preferably caustic lime. This process also permits the recovery of both the ammonia and sulphuric acid as ammonium sulphate by the evaporation of the mother liquor, in a state of sufficient purity to be used as a fertilizer. It will be understood that instead of completely neutralizing the diluted nitration mass with ammonia, 95% or thereabout of the total acidity of the nitration mass may be neutralized and the subsequent reduction carried out by means of iron without the further addition of any acid.

Without limiting our invention to any particular procedure, the following examples, in which parts by weight are given, illustrate the application of our invention in the preferred form.

Example I 1 part of naphthalene is sulphonated to form naphthalene-mono-sulphonic acid and these acids are nitrated with 1 molecular weight of nitric acid to give the mixed alpha nitro naphthalene sulphonic acids. The nitration mass is now diluted with five parts of cold water and 3 parts of 26% aqueous ammonia solution, or its equivalent in ammonia gas, is introduced slowly into the mass until the mass is completely neutralized. The neutral solution of the alpha nitro naphthalene sulphonic acids is then subjected to treatment with iron and acetic acid to form the alpha naphthylamine sulphonic acids. The finished reduction mass is made alkaline with ammonia and the excess of iron filtered off. The alpha naphthylamine sulphonic acids are now precipitated as the free acids by the addition of acid and filtered from the solution containing the ammonia salts. The alpha-naphthylamine sulphonic acids as thus obtained are very light colored and practically free from inorganic impurities. The ammonia may be recovered from the mother liquor by treatment with lime and dissolving the free ammonia in a subsequent diluted nitration mass.

Example II 1 part of naphthalene is di-sulphonated cold and the mixed 1:5 and 1:6 disulphonic acid nitrated by the addition of 1 molecular weight of nitric acid at a temperature below 40° C. to form the mixed nitro disulphonic acids (1—3—8, 1—4—8, 2—4—8, 2—4—7). The nitration mass is now diluted with water and ammonia introduced into the solution until the mass is neutral to congo red. The nitro bodies contained in solution are now reduced with iron without the addition of further acid and the isolation of the alpha naphthylamine disulphonic acids carried out as described in Example I.

We are aware that numerous details of the process may be varied through a wide range without departing from the spirit of this invention, and we do not desire limiting the patent granted hereon otherwise than as necessitated by the prior art.

We claim as our invention:

1. The process of preparing alpha naphthylamine sulphonic acids, which comprises adding ammonia as the neutralizing agent to a diluted nitration mass containing alpha nitro naphthalene sulphonic acids and free mineral acids and subsequently without filtering, reducing the alpha nitro naphthalene sulphonic acids by means of iron and acid.

2. The process of preparing alpha naphthylamine di-sulphonic acids, which comprises adding ammonia as the neutralizing agent to a diluted nitration mass containing alpha nitro naphthalene disulphonic acids and free mineral acids and subsequently without filtering, reducing the alphanitro naphthalene disulphonic acids by means of iron and acid.

3. In the process of preparing alpha naphthylamine sulphonic acids, the step which comprises adding ammonia as the neutralizing agent to a diluted nitration mass containing alpha nitro naphthalene sulphonic acids and free mineral acids to prevent the precipitation of mineral salts in the subsequent reduction process.

4. In the process of preparing alpha naphthylamine disulphonic acids, the step which comprises adding ammonia as the neutralizing agent to a diluted nitration mass containing alpha nitro naphthalene disulphonic acids and free mineral acids.

5. In the process of preparing alpha naphthylamine sulphonic acids, the step which comprises partially neutralizing a diluted nitration mass containing alpha nitro naphthalene sulphonic acids and free mineral acids with ammonia and subsequently reducing the alpha nitro naphthalene sulphonic acids in the partially neutralized mass by means of iron without the addition of further acid.

6. In the process of preparing alpha naphthylamine disulphonic acids, the step which comprises partially neutralizing a diluted nitration mass containing alpha nitro naphthalene disulphonic acids and free mineral acids with ammonia and subsequently reducing the alpha nitro naphthalene disulphonic acids in the partially neutralized mass by means of iron, without the addition of further acid.

In testimony whereof we have hereunto subscribed our names.

IVAN GUBELMANN.
JOHN M. TINKER.